(12) United States Patent
Geisler

(10) Patent No.: US 9,282,266 B2
(45) Date of Patent: Mar. 8, 2016

(54) USING AN IMAGE SENSOR FOR RECORDING FRAMES IN FAST SUCCESSION

(71) Applicant: Deutsches Zentrum für Luft- und Raumfahrt e.V., Cologne (DE)

(72) Inventor: Reinhard Geisler, Goettingen (DE)

(73) Assignee: DEUTSCHES ZENTRUM FUER LUFT-UND RAUMFAHRT E.V., Cologne (DE)

( * ) Notice: Subject to any disclaimer, the term of this patent is extended or adjusted under 35 U.S.C. 154(b) by 106 days.

(21) Appl. No.: 14/102,771

(22) Filed: Dec. 11, 2013

(65) Prior Publication Data

US 2014/0160330 A1    Jun. 12, 2014

(30) Foreign Application Priority Data

Dec. 11, 2012  (DE) .......................... 10 2012 112 118

(51) Int. Cl.
*H04N 5/372* (2011.01)
*H04N 5/335* (2011.01)
*H04N 5/355* (2011.01)

(52) U.S. Cl.
CPC ....... *H04N 5/37206* (2013.01); *H04N 5/35581* (2013.01); *H04N 5/37213* (2013.01)

(58) Field of Classification Search
CPC .......... H04N 5/37206; H04N 5/37213; H04N 5/35581
USPC .................................. 348/295–298, 319–323
See application file for complete search history.

(56) References Cited

U.S. PATENT DOCUMENTS

| | | | | |
|---|---|---|---|---|
| 5,814,810 A * | 9/1998 | Anagnostopoulos | ...... | 250/208.1 |
| 5,990,952 A * | 11/1999 | Hamasaki | ...... | 348/311 |
| 6,661,451 B1 * | 12/2003 | Kijima | ...... | H04N 9/045 |
| | | | | 348/220.1 |
| 6,972,795 B1 | 12/2005 | Etoh et al. | | |
| 7,508,436 B2 | 3/2009 | Parks | | |
| 7,636,119 B2 * | 12/2009 | Parks | ...... | H04N 3/1562 |
| | | | | 250/208.1 |
| 8,164,646 B2 * | 4/2012 | Ikeda | ...... | H04N 3/1575 |
| | | | | 250/208.1 |
| 2005/0134944 A1 * | 6/2005 | Chen | ...... | 358/513 |

OTHER PUBLICATIONS

Nasibov, Humbat; Kholmatov, Alisher; Akselli, Basak et al.: Performance Analysis of the CCD Pixel Binning Option in Particle-Image Velocimetry Measurements. IEEE/ASME Transactions on Mechatronics, vol. 15, No. 4, Aug. 2010, pp. 527-540.
Akselli, B.; Kholmatov, A.; Nasibov, K.: The use of CCD pixel binning in PIV measurements. International Symposium on Optomechatronic Technologies, Istanbul, Sep. 21-Sep. 23. 2009. ISOT 2009. Conference Proceedings, pp. 223-228.
Truesense imaging, Inc. (Ed.): KAI-0330 Image Sensor. Device Performance Specification. Revision 1.0 PS-0023, Jul. 13, 2012. PS-0023, Revision 1.0. Rochester, NY: Truesense Imaging, Inc., 2012.
Theuwissen, Albert J. P.: Solid-State Imaging with Charge-Coupled Devices. Reprinted with corrections 1996. ISBN 0-7923-3456-6. Dordrecht, Boston, London: Kluwer Academic Publishers, 1996. Chapter 6: Solid-State Imaging for Television Applications, pp. 157-191.

* cited by examiner

*Primary Examiner* — Nhan T Tran
*Assistant Examiner* — Chan Nguyen
(74) *Attorney, Agent, or Firm* — Thomas|Horstemeyer, LLP

(57) ABSTRACT

An image sensor comprising a row of light sensors registering incident light as electric signals, and a shift register including first and second register places per each light sensor is used for recording frames in fast succession. The image sensor allows for transferring the electric signals from the light sensors to the respective first register places and for shifting the electric signals on selected ones of the first and second register places forward in the shift register. After a first exposure time, the electric signals from each of a plurality of pairs of neighboring light sensors are added on one register place. After a second exposure time, the electric signals from each of the same pairs of neighboring light sensors are added on one register place located between two of the register places on which added electric signals from the first exposure time are present.

14 Claims, 7 Drawing Sheets

USING AN IMAGE SENSOR FOR RECORDING FRAMES IN FAST SUCCESSION

CROSS REFERENCE

The present application claims priority to German Patent Application No. DE 10 2012 112 118.4 entitled "Verwendung eines Bildsensors zur Aufzeichnung schnell aufeinander folgender Bilder", and filed on Dec. 11, 2012.

FIELD

The present disclosure relates to a method of using an image sensor for recording frames in fast succession. Particularly, the image sensor is a standard image sensor comprising at least one row of light sensors registering incident light as electric signals and at least one shift register including a first and a second register place per each light sensor of the at least one row of light sensors. Further, the present disclosure relates to a camera which, besides such an image sensor, comprises a controller implementing the method of using the image sensor.

In the present disclosure, the term "light sensor", on the contrary to the term "image sensor", is used to designate that entity which is often called a "pixel" of an image sensor, i.e. a single light sensitive element of the image sensor. In CCD image sensors, the electric signal generated by such a light sensor and increasing with the amount of incident light is an electric charge.

According to the present disclosure, a "row", particularly a "row of light sensors", may be oriented vertically. Then, it may also be called a "column", and the shift register may be called a "vertical register" of the respective image sensor.

BACKGROUND

Certain measurement techniques, like for example Particle Image Velocimetry (PIV), rely on recording two pictures or frames of short exposure time in fast succession. The objects to be imaged—in case of PIV these are particles following a flow of interest—are illuminated in fast succession by one or two pulsed light sources, like for example pulsed lasers. Each of the two light pulses defines the effective exposure time of one of the two frames.

It is known to use so-called "double shutter" cameras for double frame recordings. A double shutter camera records the first frame at a short but the second frame at a long overall exposure time. This means that the image sensors of a double shutter camera are not only registering ambient light during the second pulse of light but for a much longer interval of time. Thus, using a double shutter camera at high ambient light intensities is difficult or even impossible. High ambient light intensities are, for example, present with so-called in-flight measurement techniques implemented at daylight.

Known double shutter cameras have an image sensor comprising light sensors and shift registers including two register places per light sensor. This image sensor is commonly used in that, after each exposure time, the electric signals from the light sensors are transferred to the respective first register places, and that the electric signals are then shifted forward register place by register place to read them out of the shift register. Consequently, electric signals from a first exposure time have to be completely read out of the shift register before electric signals from a second exposure time can be transferred from the light sensors to the respective first register places. Thus, the second exposure time may directly follow the transfer of the electric signals from the light sensors into the shift register after the first exposure time; the second exposure time may, however, not be terminated before the electric signals from the first exposure time have been completely read out of the shift register.

In so far as disturbing ambient light occurs before the light pulses, it can be suppressed by clearing the individual light sensors prior to the desired beginning of the first or second exposure time. Thus, the beginning of the first and second exposure time may be freely selected. The end of the first exposure time may also be freely selected by transferring the electric signals from the individual light sensors to the respective first register places. The end of the second exposure time, at which the electric signals from the individual light sensors are transferred to the respective first register places, may only take place after the electric signals from the first exposure time have been completely read out of the shift register so that the shift register is ready for accepting the signals from the second exposure time.

Generally, ambient light occurring during the second exposure time after the second light pulse may be suppressed by additional fast shutters which are arranged in front of the image sensor of the camera and thus upstream of an electronic shutter of the camera. Mechanical shutters, however, are unsuitable for this purpose due to their inertia and size. Electronic shutters, like for example those of the Micro Channel Plate (MCP) or Photo Multiplier type, are fast enough but reduce the image quality and require high constructional efforts.

The terms "high speed imaging device" and "time-of-flight sensor" designate special image sensors for recording two frames at short exposure times in fast succession, and U.S. Pat. No. 6,972,795 B1 discloses such a special image sensor. Special image sensors designed for a particular purpose, however, are no standard components which are sold in high numbers and which are thus available at low cost.

Particularly, the special image sensor disclosed in U.S. Pat. No. 6,972,795 B1 comprises one register place adjacent to each light sensor and a separate signal transfer line directly connected to each register place. This construction of the light sensor, however, results in a reduced fill factor and in a reduced spatial resolution, which both reduce the evaluation quality when using this image sensor in PIV, for example.

For the purpose of recording two frames at a short exposure time in fast succession with a common image sensor, it is also known to subdivide the image sensor with respect to its lines of light sensors, and to record the first frame with the lines of even line numbers and the second frame with the lines of odd line numbers. Here, however, only half of the available light intensity is used for each frame, and the frames recorded by this method called interlacing are not congruent but display an offset of the line spacing.

Nasibov, Humbat; Kholmatov, Alisher; Akselli, Basak et al.: Performance Analysis of the CCD Pixel Binning Option in Particle-Image Velocimetry Measurements. IEEE/ASME Transactions on Mechatronics, Vol. 15, No. 4, August 2010, pp. 527-540 and Akselli, B.; Kholmatov, A.; Nasibov, K.: The use of CCD pixel binning in PIV measurements. International Symposium on Optomechatronic Technologies, Istanbul, September 21 to Sep. 23, 2009. ISOT 2009. Conference Proceedings, pp. 223-228 disclose another method of using a common image sensor for recording pictures in fast succession. Here, charges from a plurality of horizontally or vertically neighboring pixels are combined or added. This step called "binning" is executed after the respective exposure time by operating the vertical and horizontal registers of a CCD chip used as the image sensor in a special way prior to digitizing the charges. There is, however, no description of how this special way of operating the vertical and horizontal registers has to take place. By "binning", the time needed for reading all the charges corresponding to one frame out of the CCD sensor is accelerated such that its shift registers are earlier ready for accepting new charges corresponding to a next frame.

Truesense imaging, Inc. (Ed.): KAI-0330 Image Sensor. Device Performance Specification. Revision 1.0 PS-0023, Jul. 13, 2012. PS-0023, Revision 1.0. Rochester, N.Y.: Truesense Imaging, Inc., 2012 disclose an image sensor designated as KAI-0330. This image sensor comprises shift registers with two register places per each light sensor of each row of light sensors. This known image sensor allows for binning the charges of two adjacent lines of light sensors during a transfer of the charges from its vertical shift registers to its horizontal shift register.

Theuwissen, Albert J. P.: Solid-State Imaging with Charge-Coupled Devices. Reprinted with corrections 1996. ISBN 0-7923-3456-6. Dordrecht, Boston, London: Kluwer Academic Publishers, 1996. Chapter 6: Solid-State Imaging for Television Applications, pp. 157-191 describes different ways of using an image sensor comprising one shift register for each row of its light sensors. The shift register is only able to separately hold one charge per two light sensors in a row. Thus, at the end of each exposure time, either only the charges from the light sensors in every second line or the combined charges of two neighboring light sensors can be transferred into the shift registers. In the latter case called "field integration", it is avoided that only the charges accumulated in half of the light sensors during each exposure time are evaluated and that, thus, each frame has holes between the presently read-out light sensors. In field integration the pairs of neighboring light sensors whose charges are combined change within the vertically oriented rows of light sensors upwards and downwards. In both ways of using a common light sensor described here, two successively recorded frames display an offset, and the entire first frame has to be read out of the image sensor prior to terminating the second exposure time. Theuwissen also describes how to use a so-called progressive scanning image sensor having shift registers simultaneously accepting charges from all light sensors and keeping them separately. Here too, the shift registers have to be completely read out before they can accept charges from the light sensors at the end of a next exposure time.

US 2007/0002165 A1 discloses a method of capturing a sequence of images in close succession with a CCD image sensor. In this method, only the charges of every second light sensor in a row are transferred into the associated shift register after a first exposure time. The other charges are disposed when clearing the light sensors prior to the second exposure time. At the end of the second exposure time the charges collected by the other light sensors whose charge have not been used at the end of the first exposure time are transferred into the shift registers onto those register places which are still empty. Then the charges from the first and the second exposure time are read out of the shift registers. During that time, a further frame may be recorded. The charges from this further frame, however, may only be transferred into the shift register after it has been completely read out from the charges from the first and second exposure times. The first and second frames recorded according to this method display an offset of one line spacing. Further, both frames display holes as their charges are only stemming from every second line of light sensors.

There still remains a need of a method of using a common image sensor for recording a plurality of frames at a short exposure time in fast succession without offset between successive frames and holes in individual frames, and of a camera comprising a common image sensor and implementing such a method.

SUMMARY

The present disclosure provides a method of using an image sensor for recording frames in fast succession. The image sensor comprises at least one row of light sensors registering incident light as electric signals and at least one shift register including a first and a second register place per each light sensor of the at least one row of light sensors; and it is configured to transfer the electric signals from the light sensors to the respective first register places and to shift the electric signals on selected ones of the first and second register places forward register place by register place in the shift register. The method comprises, after a first exposure time of the plurality of exposure times, adding the electric signals from each of a plurality of groups of at least two light sensors neighboring in the row of light sensors on one of the first and second register places; and, after a second exposure time of the plurality of exposure times, adding the electric signals from each of the same groups of at least two light sensors neighboring in the row of light sensors on one of the first and second register places located between two of the first and second register places on which added electric signals from the first exposure time are present.

Further, the present disclosure provides a camera for recording frames in fast succession. The camera comprises an image sensor and a controller controlling the image sensor. The image sensor comprises at least one row of light sensors registering incident light as electric signals, and at least one shift register including a first and a second register place per each light sensor of the at least one row of light sensors; and it is configured to transfer the electric signals from the light sensors to the respective first register places and to shift the electric signals on selected ones of the first and second register places forward register place by register place in the shift register. The controller is configured to, after a first exposure time, add the electric signals from each of a plurality of groups of at least two light sensors neighboring in the row of light sensors on one of the first and second register places, and, after a second exposure time, add the electric signals from each of the same groups of at least two light sensors neighboring in the row of light sensors on one of the first and second register places located between two of the first and second register places on which added electric signals from the first exposure time are present.

Other features and advantages of the present disclosure will become apparent to one with skill in the art upon examination of the following drawings and the detailed description. It is intended that all such additional features and advantages be included herein within the scope of the present disclosure, as defined by the claims.

SHORT DESCRIPTION OF THE DRAWINGS

The present disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

Figure 13:
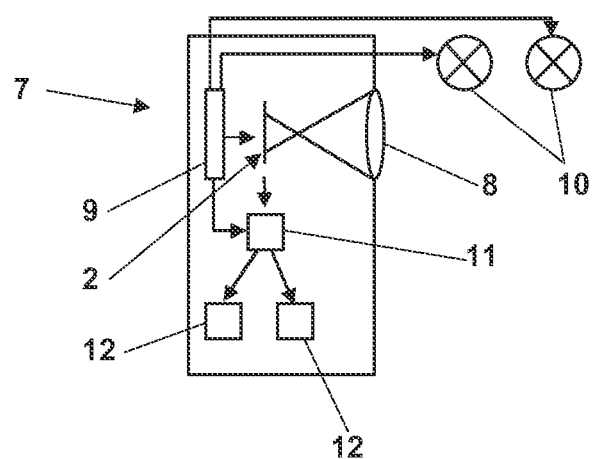

FIG. 13 schematically shows a camera comprising an image sensor which is used according to FIG. 1 or FIG. 3 and FIG. 2 or FIG. 4.

DETAILED DESCRIPTION

The present disclosure teaches how to use a common image sensor comprising at least one row of light sensors or pixels in which incident light is registered as electric signals, and at least one shift register which includes a first register place and a second register place per each light sensor of the at least one row of light sensors. After each exposure time, the electric signals from the light sensors are as usual transferred to the respective first register places and then shifted from the first to the second register places and from there to the first register places of neighboring light sensors to read the electric signals out of the shift register. For recording frames in fast succession, and on the contrary to a usual method of using a common image sensor, however, the electric signals from at least two light sensors neighboring each other in the at least one row are added or combined on one register place, and after the second exposure time, the electric signals from the same at least two light sensors neighboring each other in the row are added on a register place which is located between two register places on which added electric signals from the first exposure time are present. The addition of the signals from the first exposure time needs not be completed prior to the beginning or even prior to the end of the second exposure time. Instead, the addition of the signals from the first exposure time may partially or completely occur at the end or even after the second exposure time. The addition of the signals from the first exposure time, however, at least partially takes place prior to adding the signals from the second exposure time.

The frames recorded according to the present disclosure—due to the addition of the signals from every at least two light sensors neighboring each other in the respective row—at maximum only comprises half as many image points as light sensors are provided in the image sensor. For each frame, however, the light intensity registered by all light sensors is used, and the information in the individual image points of the successive frames always stems from the same light sensors, i.e. the frames are completely congruent. The distance in time between the end of the first exposure time and the end of the second exposure time is not determined by the time needed for completely reading the electric signals from the first exposure time out of the shift register but only by the time needed for adding and locally shifting the signals from the first exposure time until the first register places may take up the signals from the second exposure time between the places occupied by the added or combined signals from the first exposure time. The advantage that the second exposure time may already be terminated prior to completely reading the signals from the first exposure time out of the register is particularly high with image sensors having a high number of pixels and correspondingly long shift registers. Such image sensors are needed to achieve a high spatial resolution of the frames recorded.

In one embodiment of the present disclosure, all electric signals from the light sensors are simultaneously transferred to the respective first register places after the first exposure time. Afterwards, the signals from the respective at least two light sensors neighboring each other in the row of light sensors can be added on the respective first register place in the foremost position in the shift register in that at first only the signals transferred to the first register places located further backward in the shift register are shifted forward to the foremost first register place. In this way, the signals are added up over every at least two neighboring light sensors of the row of light sensors.

If the image sensor is able to keep electric signals on directly neighboring first and second register places of its shift register separate, the electric signals may then be shifted forward to that second register place neighboring the foremost first register place. Alternatively, the electric signals from the first exposure time can be directly added on this second register place. After this arrangement of the added at least two electric signals from the first exposure time on that second register place, all electric signals from the successive second exposure time can be simultaneously transferred from the light sensors to the respective first register places which are all free of electric signals from the first exposure time.

Alternatively, after having added up the electric signals from the first exposure time on the foremost first register place, the electric signals from the second exposure time may be successively transferred into the shift register and added over every at least two neighboring light sensors. Particularly, at first, only the electric signal from the respective backmost light sensor of the at least two light sensors in the row may be transferred to the respective first register place. This electric signal may then be shifted forward together with the added signals from the first exposure time by two register places onto the next first register place. The electric signals from the next one of the at least two light sensors may then be added to the electric signals from the second exposure time already present by transferring it to the respective first register place. This procedure results in slightly different overall exposure times for the individual light sensors of each of the groups of the at least two light sensors. If, however, the desired or effective exposure time is defined by an external light pulse, this only means that some of the light sensors register a little more ambient light at the end of the second exposure time before their electric signals are transferred into the shift register than the others. The amount of this ambient light, however, is some orders of magnitude less than the ambient light which is registered until a complete first frame is read out of the shift registers so that the electric signals from the second exposure time can be transferred from the light sensors into the shift registers in a usual method of using the image sensor.

Generally, the signals from the first exposure time may also be transferred into the shift register and added up as described in the last paragraph for the signals from the second exposure time. This means that, at the end of the first exposure time, at first only the electric signal from the respective backmost of the at least two light sensors in the row of light sensors is transferred to the respective first register place, that this signal is then shifted forward by two register places to the next first register place, and that the electric signals from the next one of the at least two light sensors is then added by transferring it to this next first register place. In this way, also in the first frame, a little more ambient light is registered after the actually desired exposure time, as the electric signals from the light sensors are not simultaneously transferred into the shift register, and the minimum time between the first and the second exposure time is slightly increased. On the other hand, in this way, the electric signals from the first and the second exposure time are both handled in exactly the same way.

According to the present disclosure, the added electric signals from the first and second exposure times, and from any further exposure times after which the electric signals are added over the at least two neighboring light sensors, are together serially read out of the shift register. The electric signals belonging to frames successively recorded according to the present disclosure are interleaved, i.e. the electric signals read out of each shift register include a periodic succession of the electric signals from the individual exposure times added up over the same at least two light sensors. A separation of the added electric signals belonging to the at least two frames, however, may be easily achieved in that the added signals from the shift register may be alternately forwarded towards different evaluation electronics. Alternatively, the added electric signals belonging to the at least two frames may at first be handled together and only separated later by means of software, for example.

As already indicated above, the number of the frames recorded in fast succession according to the present disclosure may be higher than two. With increasing number of the frames, however, the spatial resolution of each individual frame is reduced as with n frames, the signals from same groups of n light sensors are added after each exposure time. Further, only with two frames (and with an image sensor keeping the electric signals separate on neighboring first and second register places) it is possible to simultaneously transfer the electric signals from all light sensors into the shift register after all exposure times. With more frames, only a successive transfer is possible at least for the third and any further frame. Thus, there is an increasing amount of ambient light in the added electric signals from those further exposure times. The amount of this ambient light, however, is still much smaller than the amount of the ambient light which is accumulated for the second frame when using a common image sensor in the common way.

In the method of use according to the present disclosure, the image sensor may also be used for recording an additional frame with full spatial resolution of the image sensor but with a delayed termination of the actual exposure time in that, following the at least two exposure times, a further exposure time takes place after which the electric signals from the light sensors are only transferred to the respective first register places after the electric signals from the previous exposure times have been completely serially read out of the shift register. The additional frame recorded in this way corresponds to the second frame recorded with a double shutter camera according to the prior art.

As already indicated above, it is also suitable to use light pulses or light flashes for defining short desired exposure times. For this purpose, light pulses from one or more pulsed light sources may be synchronized with the exposure times of the image sensor. This means that the exposure times are preferably selected in such a way that they each directly terminate after one of the light pulses. Vice versa, the exposure times may begin directly prior to the respective light pulse. This may be achieved in that the light sensors, prior to each exposure time, are kept in a state in which they do not register incident light as an increasing electric signal, or in that the electric signals are cleared from the light sensors directly prior to each exposure time. For this purpose, the charges accumulated in the light sensors of a Charge-Coupled Device (CCD) image sensor may, for example, be discharged prior to the substrate of the device via an electric pulse. This clearing may take place prior to each of the at least two exposure times and may thus define the beginning of the respective exposure time.

A camera according to the present disclosure, besides a common image sensor comprising a shift register with two register places per each light sensor in at least one row of light sensors, comprises a controller which applies the method of using the image sensor according to the present disclosure.

Preferably, the image sensor is both configured to transfer electric signals from selected light sensors of the at least one row to the respective first register places and configured to shift the electric signals on selected ones of the first and second register places forward register place by register place in the shift register.

The controller will be configured to serially read the added electric signals from the first and second exposure times together out of the shift register.

The camera may further comprise a duplexer to which a first signal handling unit configured to receive the added electric signals from the first exposure time and a second signal handling unit configured to receive the added electric signals from the second exposure time are connected. Each of the first and the second signal handling units only handles the added signals belonging to one of the two frames recorded in fast succession.

Further, a method according to the present disclosure may have at least one pulsed light source synchronized with the exposure times of the image sensor.

Figure 1:
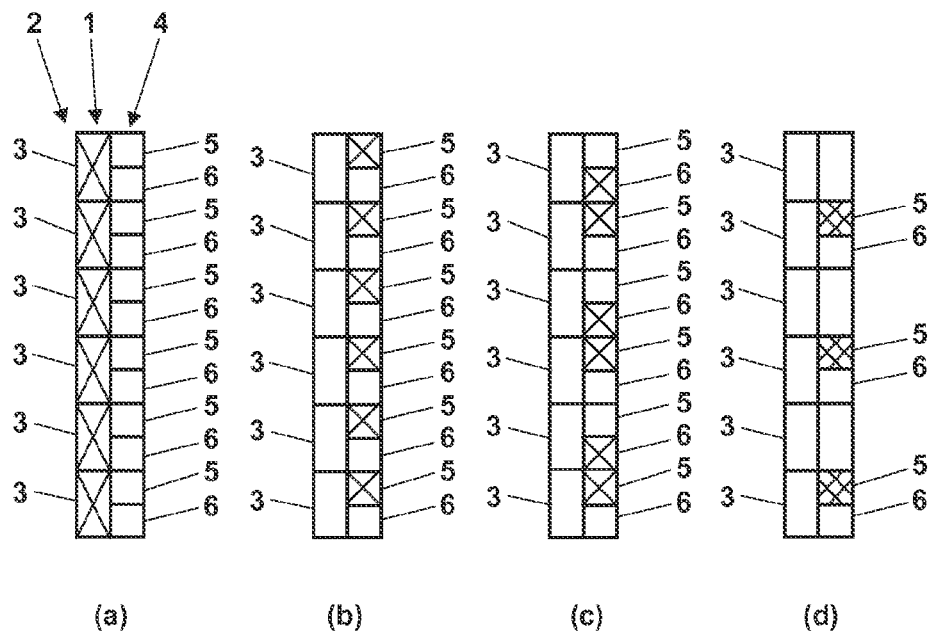
FIG. 1 illustrates a first embodiment of how electric signals from a row of light sensors of an image sensor are transferred into a shift register and added after a first one of two exposure times.

Referring now in greater detail to the drawings, FIG. 1 schematically depicts a column 1 of an image sensor 2. The column 1 comprises a row of light sensors 3 and a vertical shift register 4. The vertical shift register 4 includes a first register place 5 and a second register place 6 per each light sensor 3 in the row. FIG. 1 (*a*) indicates that during a first exposure time incident light is registered as electric signals symbolized by an "x" and increasing with the amount of incident light in every light sensor 3. In case of a CCD image sensor, the electric signals are electric charges. According to FIG. 1 (*b*), the first exposure time is terminated in that the accumulated electric signals are transferred from the light sensors 3 to the associated first register places 5. According to FIG. 1 (*c*), the electric signals on every second first register place 5, i.e. from every second light sensor 3 in the row, are shifted to the second register place 6 neighboring in downward direction. According to FIG. 1 (*d*), the same electric signals are shifted by one further register place such that the electric signals from two neighboring light sensors 3 are now together present or added on every second first register place 5. These added electric signals are symbolized by a double "x". This symbol is also used in the following figures.

Figure 2:
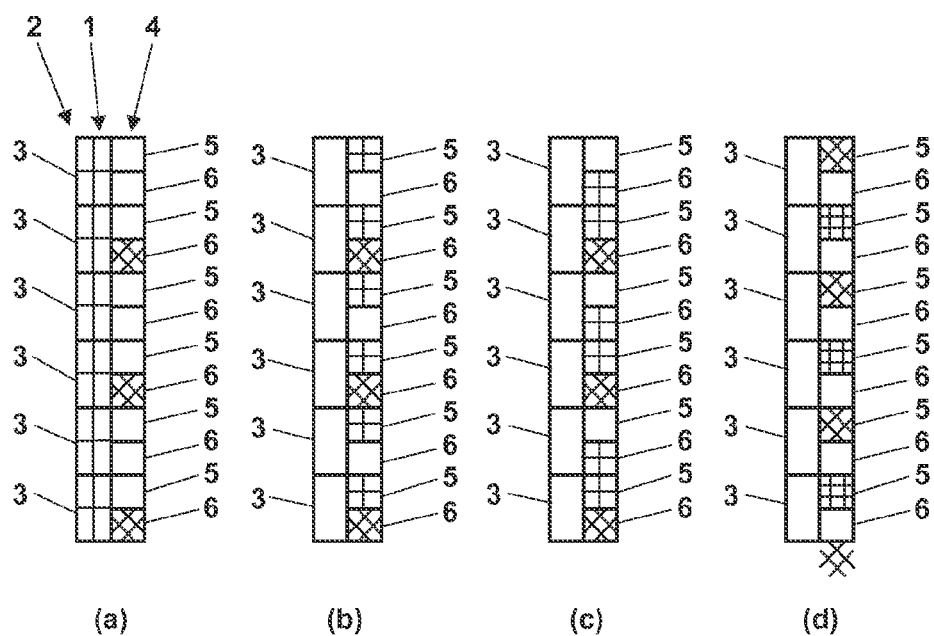
FIG. 2 illustrates a first embodiment of how electric signals from the row of light sensors are transferred into the shift register and added after a second one of the two exposure times.

FIG. 2 shows in FIG. 2 (*a*) that those added electric signals from the first exposure shifted downwards to the next second register places 6, and that during a second exposure time incident light is registered as electric signals symbolized by crosses and increasing with the amount of incident light in every light sensor 3. FIG. 2 (*b*) shows that these electric signals are simultaneously transferred from the light sensors 3 to the associated first register places 5. Afterwards, the electric signals from those first register places 5 which are located higher up or further backward in the shift register 4 are forwarded to the neighboring register place 6 (FIG. 2 (*c*)). Then, these electric signals are added to the electric signals which have been transferred to the first register places 5 located further downwards or forward in the shift register 4 (FIG. 2 (*d*)). Here and in the following figures, the added signals from the second exposure time are symbolized by double crosses.

In a further partial step, the added signals from the first exposure time are also shifted by one register place so that the added signals from the first and the second exposure time are arranged in the shift register 4 with free register places in between. Afterwards, the shift register 4 is read out by stepwise simultaneously forwarding all added electric signals register place by register place.

Figure 3:
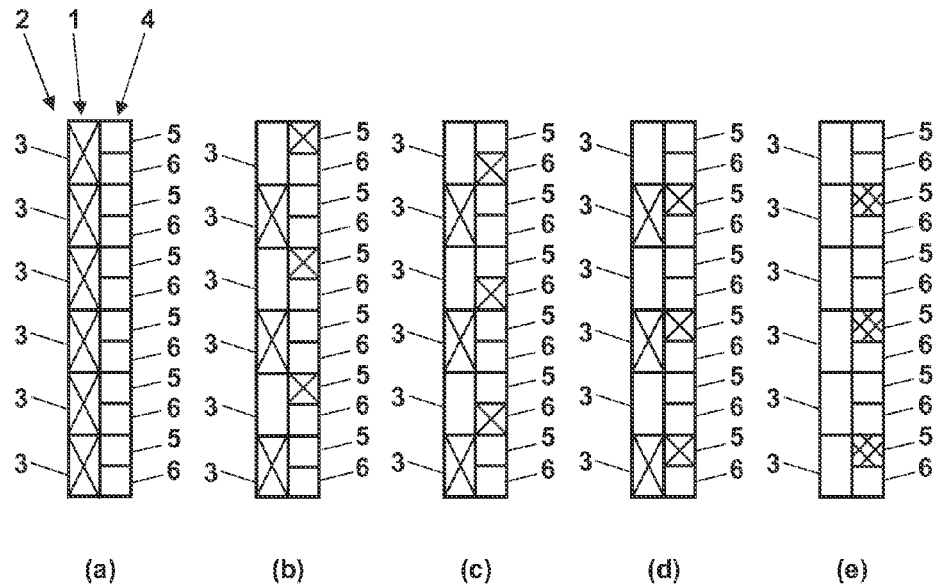
FIG. 3 illustrates a second embodiment of how electric signals from the row of light sensors are transferred into the shift register and added after the first one of the two exposure times. As an alternative to the steps depicted in FIG. 1, the steps illustrated in FIG. 3 may precede the steps depicted in FIG. 2.

FIG. 3 shows an alternative to FIG. 1 for transferring the electric signals from the first exposure time from the light sensors 3 into the shift register 4. Here, only the electric signals from every second light sensor 3 are at first transferred to the associated first register places 5 (see FIG. 3 (*b*)). Then, these electric signals are forwarded within the shift register 4 (see FIGS. 3 (*c*) and (*d*)). As soon as these electric signals have reached the next first register places 5, the electric signals which have not yet been transferred are now transferred from the associated light sensors 3 to the next first register places 5 and thus added to the electric signals already present there (FIG. 3 (*e*)).

Next, the electric signals from the second exposure time can be transferred into and added in the shift register in the same way as illustrated in FIG. 2.

Figure 4:
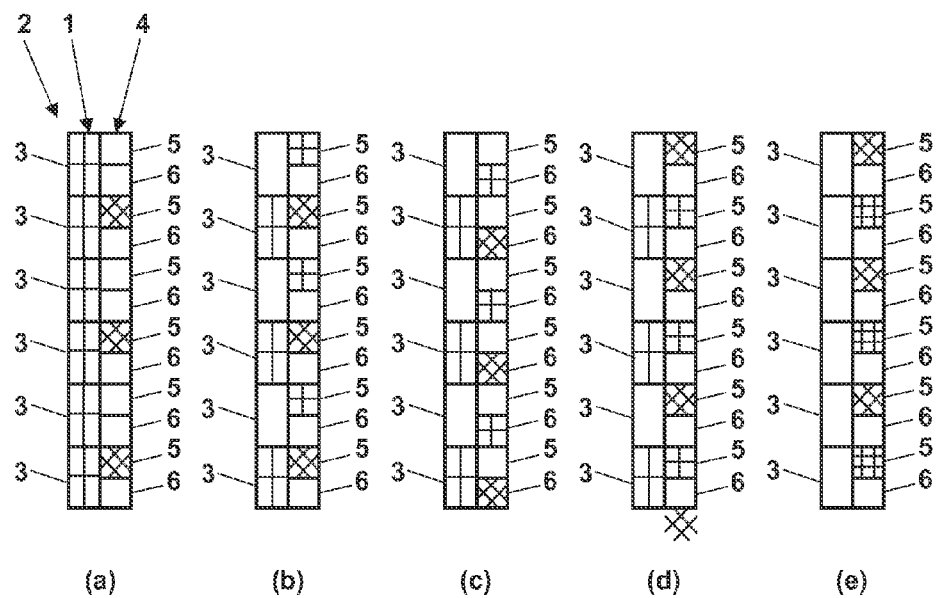
FIG. 4 illustrates a second embodiment of how the electric signals from the row of light sensors are transferred into the shift register and added after the second one of the two exposure times. These steps may follow those steps depicted in FIG. 1 or to those depicted in FIG. 3.

FIG. 4 shows an alternative to FIG. 2 for this transfer of the electric signals from the second exposure time. After the electric signals have been accumulated in the light sensors 3 during the second exposure time according to FIG. 4 (*a*), the electric signals from only half of the light sensors 3 are transferred to the associated first register places 5 (FIG. 4 (*b*)). Afterwards, these signals from the second exposure time are shifted forward together with the already added signals from the first exposure time according to FIGS. 4 (*c*) and (*d*), until the already transferred signals from the second exposure time are located behind those light sensors 3 with the not yet transferred electric signals from the second exposure time.

According to FIG. 4 (*e*), the electric signals from the second exposure time are then added in pairs by transferring the remaining electric signals into the shift register 4. This results in a similar situation as depicted in FIG. 2 (*d*). Whereas, however, according to FIGS. 1 and 2, all electric signals are transferred out of the light sensors 3 into the register 4 directly after the respective exposure time, all signals added according to FIGS. 3 and 4 comprise a component, i.e. an electric signal, which has only been transferred from the respective light sensor 3 onto the associated first register place 5 at a small delay and which may thus comprise more ambient light or background noise.

On the other hand, the steps according to FIG. 4 may also be implemented with a shift register 4 which is unable to keep electric signals located on neighboring first and second register places 5, 6 separate. Most commercially available image sensors require that a register place 5, 6 is left free between two register places holding electric signals which are not to be added up. Further, the procedure illustrated in FIGS. 3 and 4 for two exposure times in fast succession may easily be expanded to three or more exposure times.

Figure 6:
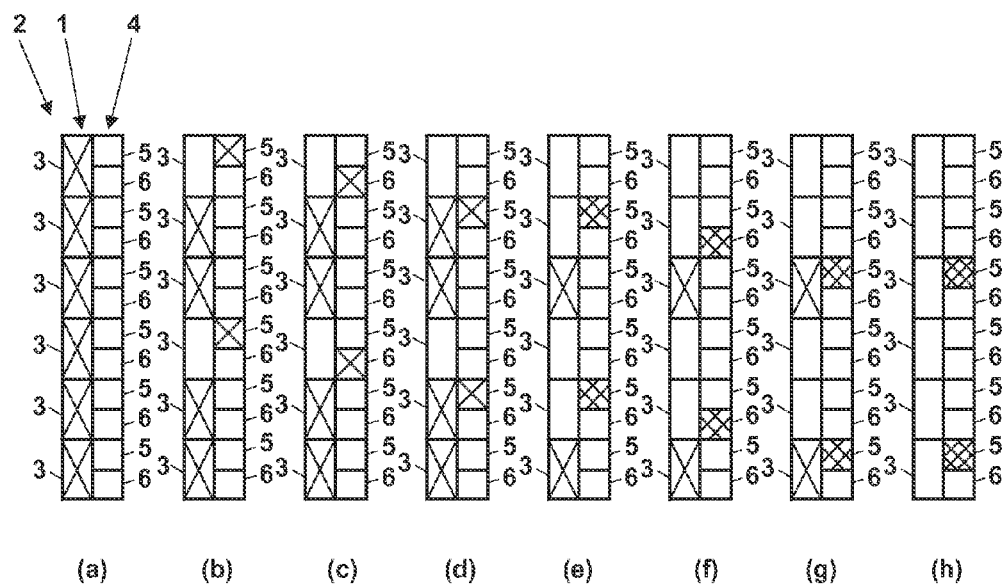
FIG. 6 illustrates a second embodiment of how electric signals from the row of light sensors are transferred into the shift register and added after the first one of the three exposure times.
Figure 8:
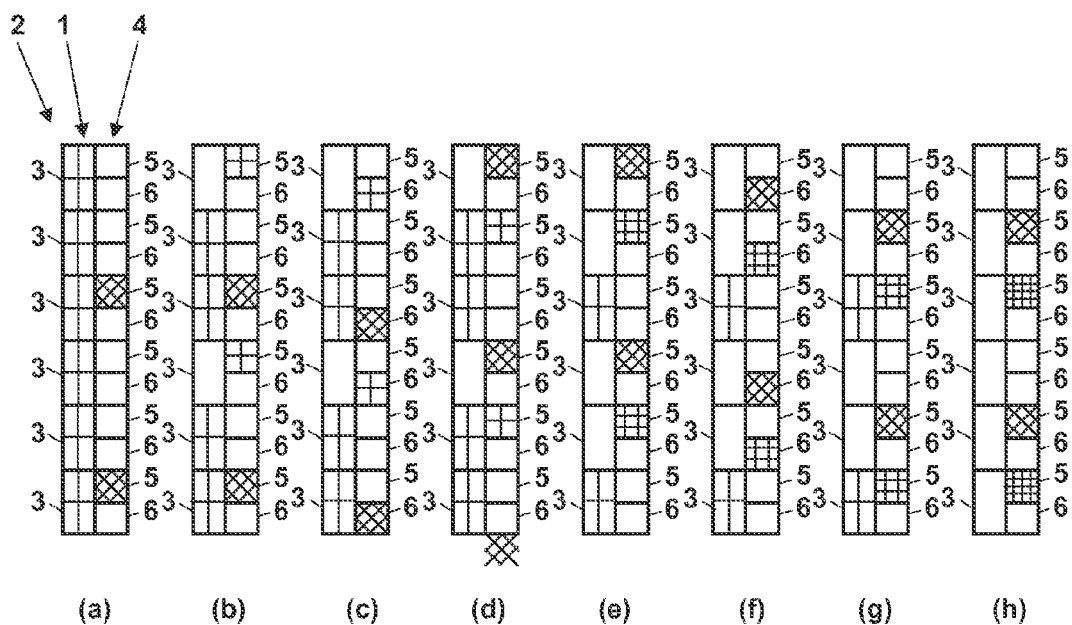
FIG. 8 illustrates a second embodiment of how the electric signals from the row of light sensors are transferred into the shift register and added after the second one of the three exposure times.
Figure 9:
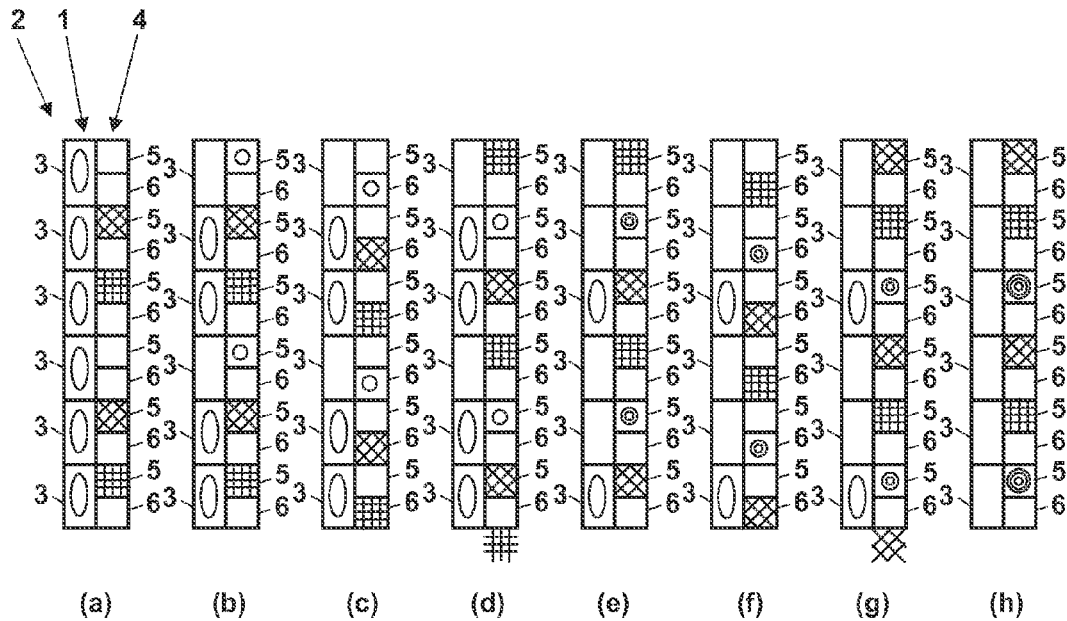
FIG. 9 illustrates a first embodiment of how the electric signals from the row of light sensors are transferred into the shift register and added after a third one of the three exposure times.

For three exposure times in fast succession this is depicted in FIGS. 6, 8 and 9 for the first, second and third exposure time, respectively. The electric signals from the third exposure time are indicated by circles.

Figure 5:
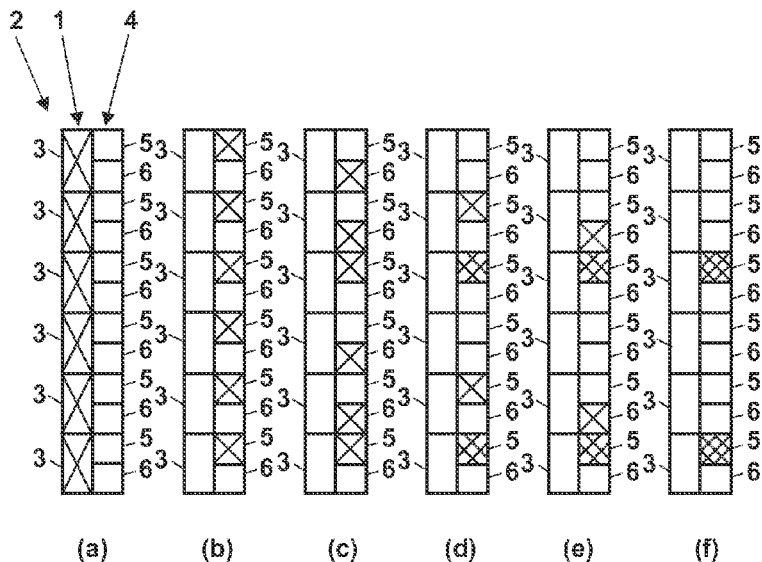
FIG. 5 illustrates a first embodiment of how electric signals from the row of light sensors are transferred into the shift register and added after a first one of three exposure times.
Figure 7:
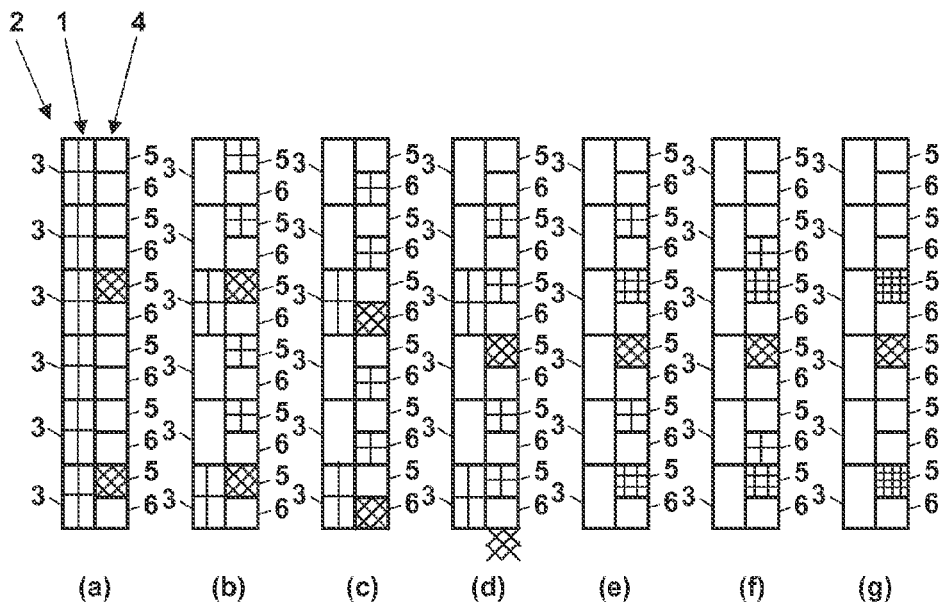
FIG. 7 illustrates a first embodiment of how the electric signals from the row of light sensors are transferred into the shift register and added after a second one of the three exposure times.

FIG. 5 shows that even with three exposure times following each other in fast succession, the electric signals from the first exposure time may be simultaneously transferred from all light sensors 3 into the shift register 4, and added up in the shift register 4 for every group of three neighboring light sensors 3. FIG. 7 illustrates how, after a second of three exposure times according to FIG. 7 (*a*), at least the signals from two of every three neighboring light sensors 3 can be transferred to the respective first register places 5 directly, see FIG. 7 (*b*). In this way, the complete transfer of the electric signals from the second exposure time into the register 4 may be accelerated at least somewhat.

Figure 10:
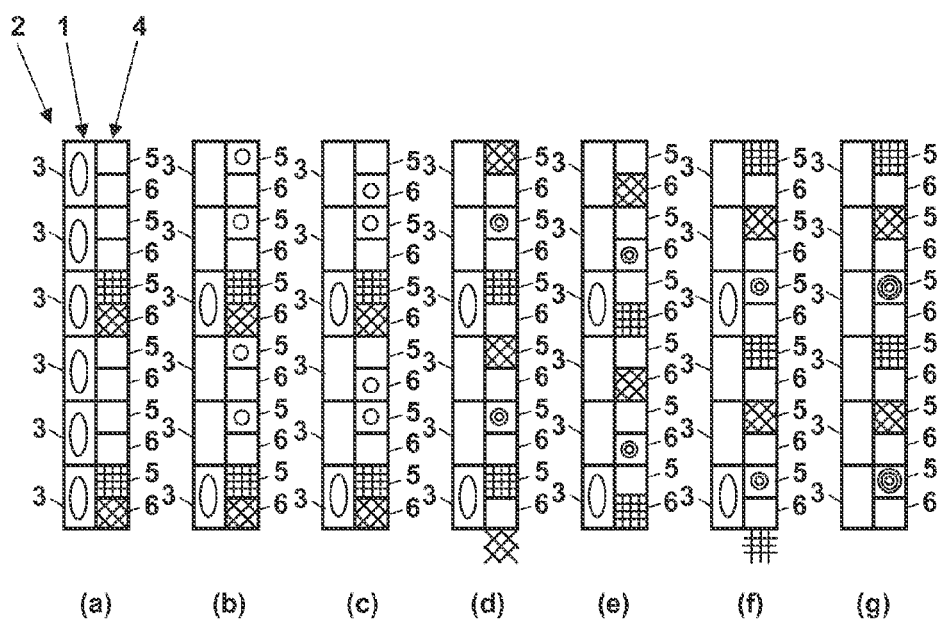
FIG. 10 illustrates a second embodiment of how the electric signals from the row of light sensors are transferred into the shift register and added after the third one of the three exposure times.

After the steps of FIG. 7, the electric signals from the third exposure time may be transferred and added up according to FIG. 10. Here, the electric signals from two of every three light sensors 3 are again directly transferred into the shift register, and only the transfer from the third light sensor 3 is slightly delayed. The steps according to FIG. 10, however, like the steps according to FIG. 4, require that the shift register 4 is able to hold electric signals separately in directly neighboring first and second register places 5, 6.

Further variations and combinations of the steps depicted in FIGS. 1 to 10 are possible.

Figure 11:
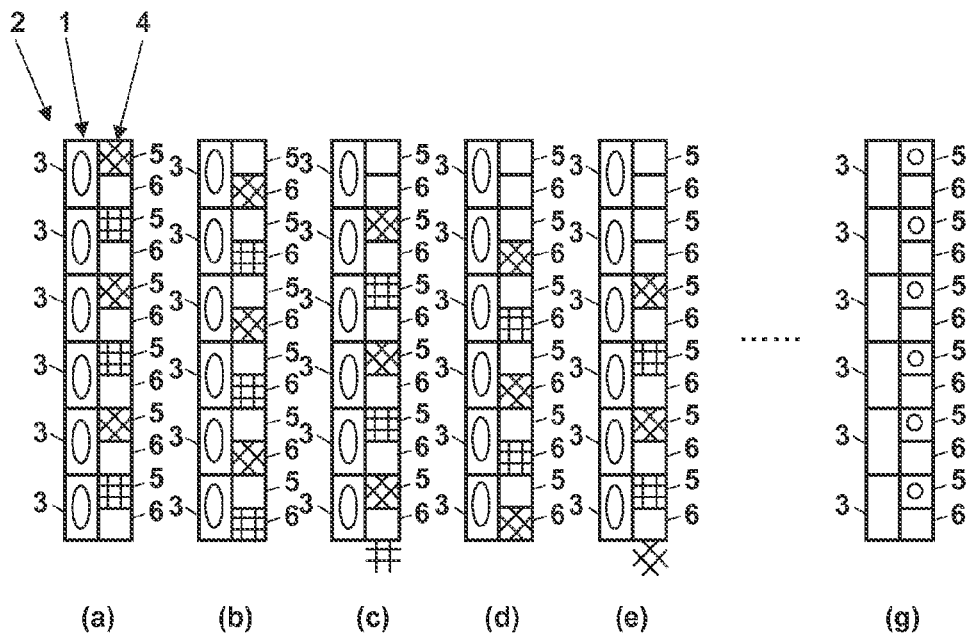
FIG. 11 illustrates how the signals from the row of light sensors may be transferred into the shift register after a further exposure time following the two exposure times according to FIG. 1 or FIG. 3 and FIG. 2 or FIG. 4.

FIG. 11 illustrates how, after the steps according to FIG. 1 or 3 with regard to electric signals from the first exposure time and according to FIG. 2 or 4 with regard to the electric signals from the second exposure time, a third frame may be recorded in a further exposure. The electric signals from this further exposure time may, however, only be transferred from the light sensors 3 into the shift register after the electric signals from the two previous exposure times have been completely read out of the shift register 4. Thus, the further frame has a longer overall exposure time in which the light sensors 3 are sensitive to incident light and will, as a result, include more background noise as compared to the desired exposure time defined by a light flash or pulse than the frames recorded in the first and second exposure times.

The use of a common image sensor according to the present disclosure has been tested with an image sensor Kodak KAI0330, a progressively scannable interline transfer CCD sensor with even/odd addressable lines. The control of this image sensor may, with regard to its electronic shutter and to reading out its shift registers, correspond to a common progressive operation of this image sensor. The special steps of the method of use of the present disclosure are focused on how the electric signals are transferred from the photodiodes, i.e. the light sensors, into the shift registers, i.e. to that time between the end of the first exposure time and reading out the shift registers.

Figure 12:
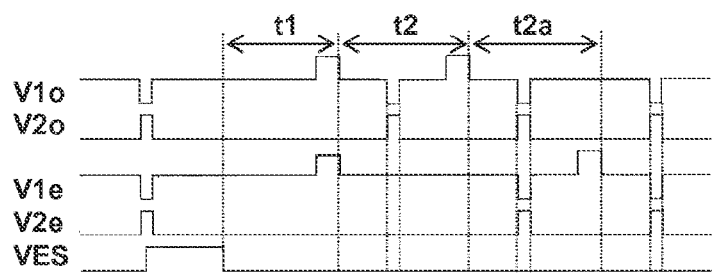
FIG. 12 illustrates an example of signals controlling an image sensor for using it according to FIGS. 1 and 4.

FIG. 12 depicts the temporal course of various control signals applied to operate the image sensor Kodak KAI 0330 according to the present disclosure. These signals are:

a control signal VES clearing the light sensors of all lines by means of a positive pulse, the exposure time beginning with the trailing edge of VES;

a control signal V1$o$ sent to every second of the lines of light sensors following each other in vertical direction, i.e. to all lines of odd numbers, a positive potential of the control signal V1$o$ transferring the signals (charges) from the light sensors of the odd lines to the associated first register places, and a leading edge of a negative pulse of the control signal V1$o$ causing that the electric signals are shifted from the first register places to the second register places of the odd lines;

a control signal V2$o$ also sent to all odd lines of light sensors, a leading edge of a negative pulse of the control signal V2$o$ which is of opposite phase as compared to the control signal V1$o$ causing that the electric signals from the second register places of the odd lines are shifted forward to the first register places of the next even lines of light sensors, and a control signal V1$e$ sent to the respective other ones of every two lines of light sensors following each other in vertical direction, i.e. to all lines of even numbers, and corresponding to the control signal V1$o$ sent to all odd lines of light sensors; and a control signal V2$e$ also sent to all even lines of light sensors and corresponding to the control signal V2$o$ sent to all odd lines of light sensors.

Every exposure time begins with the trailing edge of a positive pulse of VES. The positive pulses of V1$o$ and V1$e$ transfer the loads from the photodiodes, i.e. the electric signals from the light sensors, into the register 4 according to FIG. 1 ($b$). Thus, the first exposure time t1 is terminated. By means of V1$o$ and V2$o$ the loads are shifted forward from every second first register place until they are added on the next first register place to the load which has been directly transferred to this next first register place, see FIGS. 1 ($c$) and ($d$).

Directly after transferring the loads from the first exposure time into the shift registers, the second exposure time begins. For half of the light sensors 3, the second exposure time ends with transferring the loads to the associated first register places by the second positive pulse of V1$o$ (in the way shown in FIG. 4 ($b$)). By means of V1$o$, V2$o$, V1$e$ and V2$e$, all loads in the shift registers are shifted forward by two register places (see FIGS. 4 ($c$) and ($d$)). Then, by means of V1$e$ the remaining loads from the second exposure times are also transferred to the associated first register places and thus added to the loads from the second exposure time which are already in the shift registers (see FIG. 4 ($e$)). Here, the second exposure time is prolonged from t2 to t2+t2$a$ for half of the light sensors. Afterwards, the shift registers 4 are serially read out by repeatedly applying the control signals V1$o$, V2$o$, V1$e$ and V2$e$.

Realistically, exposure times of less than 1/32,000sec may be achieved in this way, even for the second exposure time prolonged by t2$a$.

FIG. 13 illustrates a camera 7 comprising an image sensor 2 behind an objective 8 and a controller 9 for controlling the image sensor 2. The controller 9 further controls two pulsed light sources 10 by which light flashes can be emitted to strongly illuminate an object of interest. By means of the controller 9, the image sensor 2 is read out via a duplexer 11 into two separate signal handling units 12. The interleaved added electric signals from two frames recorded in fast succession read out of each register are alternately assigned to one and the other of the two signal handling units 12. The controller 9 is particularly provided for using the image sensor 2 according to FIG. 1 or FIG. 3 and FIG. 2 or FIG. 4, i.e. for recording two frames at short exposure times in fast succession.

Many variations and modifications may be made to the preferred embodiments of the disclosure without departing substantially from the spirit and principles of the present disclosure. All such modifications and variations are intended to be included herein within the scope of the present disclosure, as defined by the following claims.

I claim:

1. A method of using an image sensor for recording frames in fast succession, the image sensor comprising at least one row of light sensors registering incident light as electric signals and at least one shift register including a first and a second register place per each light sensor of the at least one row of light sensors, and configured to transfer the electric signals from the light sensors to the respective first register places and to shift the electric signals on selected ones of the first and second register places forward register place by register place in the shift register, the method comprising:

after a first exposure time of the plurality of exposure times, adding the electric signals from each of a plurality of groups of at least two light sensors neighboring in the row of light sensors on one of the first and second register places, and after a second exposure time of the plurality of exposure times, adding the electric signals from each of the same groups of at least two light sensors neighboring in the row of light sensors on one of the first and second register places located between two of the first and second register places on which added electric signals from the first exposure time are present, wherein, after the first exposure time, the electric signals from all light sensors are simultaneously transferred to the respective first register places, and wherein, afterwards, the electric signals from each of the groups of light sensors are added on the foremost first register place belonging to the respective group of light sensors by primarily shifting forward those electric signals which have been transferred to further backward first register places in the shift register.

2. The method of claim 1, wherein, after the first exposure time, at first only the electric signal from that light sensor of each of the groups of light sensors which is positioned most backward along the shift register is transferred to the respective first register place, wherein this electric signal is then shifted by two register places to the next first register place in the shift register, and wherein the electric signal from the next light sensor of each of the groups of light sensors is then added by transferring it to this next first register place.

3. The method of claim 1, wherein the electric signals added on the foremost first register place are shifted forward to the neighboring second register place in the shift register, and wherein, after the second exposure time, the electric signals from all light sensors are simultaneously transferred to the respective first register places.

4. The method of claim 1, wherein, after the second exposure time, at first only the electric signal from that light sensor of each of the groups of light sensors which is positioned most backward along the shift register is transferred to the respective first register place, wherein this electric signal is then shifted by two register places to the next first register place in the shift register, and wherein the electric signal from the next light sensor of each of the groups of light sensors is then added by transferring it to this next first register place.

5. The method of claim 1, wherein the added electric signals from at least the first and second exposure times are together serially read out of the shift register.

6. The method of claim 5, wherein the added signals from the first and second exposure times are allotted to separate first and second signal handling units when serially reading out the shift register.

7. The method of claim 5, wherein a third exposure time of the plurality of exposure times follows to the second exposure time and wherein the electric signals from the light sensors are only transferred to the respective first register places after the third exposure time when the added signals from the first and second exposure times have been serially read out of the shift register.

8. The method of claim 1, wherein light flashes from at least one pulsed light source are synchronized with the exposure times.

9. The method of claim 1, wherein the electric signals in the light sensors are cleared prior to each of the plurality of exposure times.

10. A camera for recording frames in fast succession, the camera comprising:
   an image sensor
      comprising at least one row of light sensors registering incident light as electric signals, and at least one shift register including a first and a second register place per each light sensor of the at least one row of light sensors, and
      configured to transfer the electric signals from the light sensors to the respective first register places and to shift the electric signals on selected ones of the first and second register places forward register place by register place in the shift register; and
   a controller controlling the image sensor and configured to,
      after a first exposure time, add the electric signals from each of a plurality of groups of at least two light sensors neighboring in the row of light sensors on one of the first and second register places, and
      after a second exposure time, add the electric signals from each of the same groups of at least two light sensors neighboring in the row of light sensors on one of the first and second register places located between two of the first and second register places on which added electric signals from the first exposure time are present, wherein the controller controlling the image sensor is configured to, after the first exposure time, the electric signals from all light sensors are simultaneously transferred to the respective first register places, and wherein, afterwards, the electric signals from each of the groups of light sensors are added on the foremost first register place belonging to the respective group of light sensors by primarily shifting forward those electric signals which have been transferred to further backward first register places in the shift register.

11. The camera of claim 10, wherein the image sensor is configured to transfer electric signals from selected light sensors of the at least one row to the respective first register places.

12. The camera of claim 10, wherein the controller is configured to serially read the added electric signals from the first and second exposure times together out of the shift register.

13. The camera of claim 12 and further comprising a duplexer to which a first signal handling unit configured to receive the added electric signals from the first exposure time and a second signal handling unit configured to receive the added electric signals from the second exposure time are connected.

14. The camera of claim 10, wherein a pulsed light source is provided which is synchronized with the exposure times of the image sensor.

* * * * *